United States Patent
Yang et al.

(10) Patent No.: US 9,896,600 B2
(45) Date of Patent: Feb. 20, 2018

(54) FUNCTIONAL MATERIAL AND METHOD FOR PREPARING THE SAME, TOUCH STRUCTURE AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Hongbo Feng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 41 days.

(21) Appl. No.: 14/646,099

(22) PCT Filed: Nov. 21, 2014

(86) PCT No.: PCT/CN2014/091833
§ 371 (c)(1),
(2) Date: May 20, 2015

(87) PCT Pub. No.: WO2016/015407
PCT Pub. Date: Feb. 4, 2016

(65) Prior Publication Data
US 2016/0251544 A1 Sep. 1, 2016

(30) Foreign Application Priority Data

Jul. 29, 2014 (CN) .......................... 2014 1 0366545

(51) Int. Cl.
| | |
|---|---|
| *C09D 179/08* | (2006.01) |
| *C09C 1/40* | (2006.01) |
| *C08K 3/20* | (2006.01) |
| *C09C 3/10* | (2006.01) |
| *C09D 7/12* | (2006.01) |
| *C09C 1/00* | (2006.01) |
| *C09C 1/28* | (2006.01) |

(Continued)

(52) U.S. Cl.
CPC .......... *C09D 179/08* (2013.01); *C08G 69/26* (2013.01); *C08K 9/10* (2013.01); *C08L 29/04* (2013.01); *C08L 67/00* (2013.01); *C09C 1/00* (2013.01); *C09C 1/28* (2013.01); *C09C 1/34* (2013.01); *C09C 1/40* (2013.01); *C09C 3/10* (2013.01); *C09D 7/12* (2013.01); *G02B 5/18* (2013.01); *G02B 27/22* (2013.01); *G06F 3/041* (2013.01); *C08K 3/22* (2013.01); *C08K 3/38* (2013.01); *C08K 2003/2203* (2013.01); *C08K 2003/2244* (2013.01); *G06F 2203/04103* (2013.01)

(58) Field of Classification Search
CPC .......... C09D 179/08; C09D 7/12; C09C 1/40; C09C 3/10; C09C 1/00; C09C 1/28; C09C 1/34; C08G 69/26; C08K 9/10; C08K 3/22; C08K 3/041; C08K 3/38; C08K 2003/2203; C08L 29/04; C08L 67/00; G02B 5/18; G02B 27/22; G06F 3/041; G06F 2203/04103
See application file for complete search history.

(56) References Cited

U.S. PATENT DOCUMENTS

| | | | |
|---|---|---|---|
| 3,863,325 A * | 2/1975 | Gurganus ................ | B21J 3/00 29/423 |
| 4,759,987 A | 7/1988 | Mizobe et al. | |

(Continued)

FOREIGN PATENT DOCUMENTS

| | | |
|---|---|---|
| CN | 1656148 A | 8/2005 |
| CN | 101853761 A | 10/2010 |

(Continued)

OTHER PUBLICATIONS

Machine translation of WO 2011033751 (2011).*

(Continued)

*Primary Examiner* — Callie E Shosho
*Assistant Examiner* — John D Freeman
(74) *Attorney, Agent, or Firm* — Ladas & Parry LLP

(57) ABSTRACT

The present invention provides a functional material, its preparation method, touch structures and touch display devices, which can solve the pollution problem in current touch display devices. The functional material includes an inorganic mixed powder with a modified layer, the inorganic mixed powder comprising boron oxide, sodium oxide, lithium oxide, zirconium oxide, aluminum oxide, zinc oxide, titanium oxide, silicon dioxide, calcium oxide, silver complexes, silver phosphate, silver nitrate, tourmaline, silver thiosulfate, carbon nanotubes, aluminum sulfate, manganese, manganese oxide, iron, iron oxide, cobalt, cobalt oxide, nickel, nickel oxide, chromium, chromium oxide, copper, copper oxide, magnesium oxide, boron carbide, silicon carbide, titanium carbide, zirconium carbide, tantalum carbide, molybdenum carbide, boron nitride, chromium nitride, titanium nitride, zirconium nitride, aluminum nitride, chromium boride, $Cr_3B_4$, titanium boride, zirconium boride, tungsten disilicide, and titanium disilicide; the modified layer being generated by the reaction of a dianhydride and a diamine.

8 Claims, 2 Drawing Sheets

(51) Int. Cl.
*C09C 1/34* (2006.01)
*C08G 69/26* (2006.01)
*C08K 9/10* (2006.01)
*C08L 29/04* (2006.01)
*C08L 67/00* (2006.01)
*G02B 5/18* (2006.01)
*G02B 27/22* (2018.01)
*G06F 3/041* (2006.01)
*C08K 3/22* (2006.01)
*C08K 3/38* (2006.01)

(56) References Cited

U.S. PATENT DOCUMENTS

| | | | | |
|---|---|---|---|---|
| 5,344,916 | A * | 9/1994 | Harris | C08G 69/26 349/120 |
| 5,367,012 | A * | 11/1994 | Aitken | C08K 3/22 523/451 |
| 2003/0013838 | A1* | 1/2003 | Yamashita | C08G 73/10 528/170 |
| 2003/0181626 | A1 | 9/2003 | Lindway | |
| 2004/0220339 | A1* | 11/2004 | Chen | C08F 283/00 525/178 |
| 2005/0170180 | A1* | 8/2005 | Kawa | B32B 27/36 428/402 |
| 2006/0240232 | A1* | 10/2006 | Faris | G02B 1/111 428/212 |
| 2007/0154716 | A1* | 7/2007 | Czubarow | C08K 3/22 428/411.1 |
| 2007/0231588 | A1* | 10/2007 | Kanakarajan | B32B 15/08 428/458 |
| 2007/0242055 | A1* | 10/2007 | Lai | G06F 3/0412 345/173 |
| 2009/0146107 | A1 | 6/2009 | Lin et al. | |
| 2011/0227851 | A1 | 9/2011 | Oh et al. | |
| 2012/0068946 | A1 | 3/2012 | Tang et al. | |
| 2013/0105209 | A1 | 5/2013 | Wang | |
| 2014/0252386 | A1* | 9/2014 | Ito | H01L 51/524 257/98 |

FOREIGN PATENT DOCUMENTS

| | | |
|---|---|---|
| CN | 103555003 A | 2/2014 |
| CN | 103739205 A | 4/2014 |
| CN | 103779504 A | 5/2014 |
| CN | 104231680 A | 12/2014 |
| CN | 104292889 A | 1/2015 |
| WO | WO 2011033751 A1 * | 3/2011 ......... C08G 73/1042 |

OTHER PUBLICATIONS

International Search Report dated Mar. 25, 2015; PCT/CN2014/091833.

Written Opinion of the International Searching Authority dated Mar. 25, 2016; PCT/CN2014/091833.

First Chinese Office Action Appln. No. 201410366545.4; dated Aug. 17, 2015.

* cited by examiner

FUNCTIONAL MATERIAL AND METHOD FOR PREPARING THE SAME, TOUCH STRUCTURE AND TOUCH DISPLAY DEVICE

TECHNICAL FIELD

The present invention relates to the display technical field, in particular, to a functional material and a method for preparing the same, a touch structure and a touch display device.

BACKGROUND

Touch display devices are display devices which can be directly controlled by touching a display screen. Touch display devices generally include a display panel for display (such as an organic light emitting diode display panel and a liquid crystal display panel) and a touch structure for realizing touch control which typically comprises a touchpad provided with a touch device such as a touch electrode. The touchpad may be an independent structure set outside the light-exiting surface of the display panel, and a further cover plate can be set outside the touchpad for protecting the display panel, or the touchpad serves the function of a cover plate at the same time without an independent cover plate, i.e., One Glass Solution (OGS) can be employed. Alternatively, the touchpad can also be integrated with certain basal plate(s) in the display panel. In other words, the touchpad may be a part of the display panel, or a certain basal plate in the display panel is the touchpad, i.e., In Cell Touch (ICT) can be employed.

Nonetheless, display panels of touch display devices will inevitably produce some electromagnetic radiation pollution during use, which may impair human's health. In particular, mobile phones exert a more significant impact on human health, since they are often used at a place extremely close to human bodies.

SUMMARY

Concerning the pollution that may arise from the use of current touch display devices, the present invention provides an environmentally friendly functional material that can play a role in health care, and a method for preparing the same, as well as a touch structure and a touch display device.

One technical solution employed to address the technical problem of the present invention is a functional material comprising an inorganic mixed powder having a modified layer on its surface, the inorganic mixed powder comprising a primary ingredient and a secondary ingredient;

the primary ingredient consisting of boron oxide, sodium oxide, lithium oxide, and zirconium oxide;

the secondary ingredient including any one or more of aluminum oxide, zinc oxide, titanium oxide, silicon dioxide, calcium oxide, silver complexes, silver phosphate, silver nitrate, tourmaline, silver thiosulfate, carbon nanotubes, aluminum sulfate, manganese, manganese oxide, iron, iron oxide, cobalt, cobalt oxide, nickel, nickel oxide, chromium, chromium oxide, copper, copper oxide, magnesium oxide, boron carbide, silicon carbide, titanium carbide, zirconium carbide, tantalum carbide, molybdenum carbide, boron nitride, chromium nitride, titanium nitride, zirconium nitride, aluminum nitride, chromium boride, $Cr_3B_4$, titanium boride, zirconium boride, tungsten disilicide, and titanium disilicide; and the modified layer being generated by reaction of a dianhydride and a diamine.

For example, the molar ratio of the dianhydride to the diamine for generating the modified layer is from 0.85:1 to 1.05:1.

More preferably, the molar ratio of the dianhydride to the diamine for generating the modified layer is from 0.92:1 to 1.05:1.

For example, the dianhydride for generating the modified layer contains at least one phenyl group, and the diamine for generating the modified layer contains at least one phenyl ring or at least one non-phenyl six-membered carbocyclic ring.

More preferably, the dianhydride for generating the modified layer is selected from any one of pyromellitic dianhydride, trimellitic anhydride, benzophenone dianhydride, biphenyl dianhydride, diphenyl ether dianhydride, and 4,4'-(Hexafluoroisopropylidene)diphthalic anhydride; the diamine for generating the modified layer is selected from any one of 3-amino-benzylamine, 2,2'-difluoro-4,4'-(9-fluorenylidene)diphenylamine, 2,2-bis(3-amino-4-hydroxyphenyl)hexafluoropropane, hexahydro-m-xylylene diamine, 1,4-bis (aminomethyl)cyclohexane, 2,2-bis[4-(4-aminophenoxy)phenyl]hexafluoropropane, 2,2-bis(3-amino-4-methylphenyl)hexafluoropropane, 2,2-bis(3-aminophenyl) hexafluoropropane, 2,2-bis(4-aminophenyl) hexafluoropropane, 2,7-diamino-fluorene, m-xylylenediamine, and 4,4'-methylene bis(2-ethyl-6-methylaniline).

For example, the particle diameter of the inorganic mixed powder is from 1 to 5000 nm.

One technical solution used to address the technical problem of the present invention is a method for preparing the above functional material, comprising:

mixing the inorganic mixed powder, the dianhydride, and the diamine with an initiator and a solvent uniformly; and heating to react the dianhydride with the diamine, to form the modified layer on the surface of the inorganic mixed powder.

For example, the mass ratio of the inorganic mixed powder to the substance generated from the reaction of the dianhydride and the diamine is from 20:1 to 1:1.

More preferably, the initiator is any one of azobisisobutyronitrile, 2,2'-azobis(2,4-dimethylvaleronitrile), dimethyl azobisisobutyrate, and azobisisovaleronitrile.

For example, the heating is carried out in two steps, specifically comprising: heating at a temperature of 35 to 70° C. for 20 to 40 min; and heating at a temperature of 70 to 100° C. for 20 to 40 min.

One technical solution employed to address the technical problem of the present invention is a touch structure comprising a touchpad for touching, wherein a surface film layer containing the functional material described above is provided outside the touchpad.

For example, the thickness of the surface film layer is from 50 to 1000 nm, wherein the mass percentage of the functional material in the surface film layer is from 0.1% to 10%.

More preferably, the mass percentage of the functional material in the surface film layer is from 0.5% to 5%.

For example, the touch structure further comprises a cover plate provided outside the touchpad, wherein the surface film layer is disposed outside the cover plate or between the touchpad and the cover plate.

One technical solution employed to address the technical problem of the present invention is a touch display device comprising the touch structure described above.

Functional materials of the present invention can emit far-infrared light and negative ions. Far-infrared light, after being absorbed by a human body, can allow water molecules in the body to resonate and be activated, which enhances the intermolecular bonding force, thereby activating proteins and other biological macromolecules and bringing the organism cells to the highest vibration level. Furthermore, far-infrared heat can be transferred to a subcutaneous deeper part, thus increasing the temperature of the subcutaneous deeper part, expanding the capillaries, promoting the blood circulation, strengthening the metabolism among tissues, promoting a tissue regeneration capacity, enhancing the organism immunity, and bringing the vivacity. On the other hand, negative ions can decompose and oxidize bacteria and organic substances, and may serve the function of disinfection and sterilization and produce the effect of improving air quality. Therefore, the functional material may play a role in health care and is environmentally friendly.

The surface of the inorganic mixed powder in the functional material according to the present invention has a modified layer, which can allow the inorganic mixed powder to bond well with the surface film layer and can further improve the inorganic mixed powder's capacity to emit far-infrared light and negative ions, so that the functional material is well incorporated into the touch structure to increase its environmental friendliness without affecting the performance of the touch structure itself.

Figure 1:
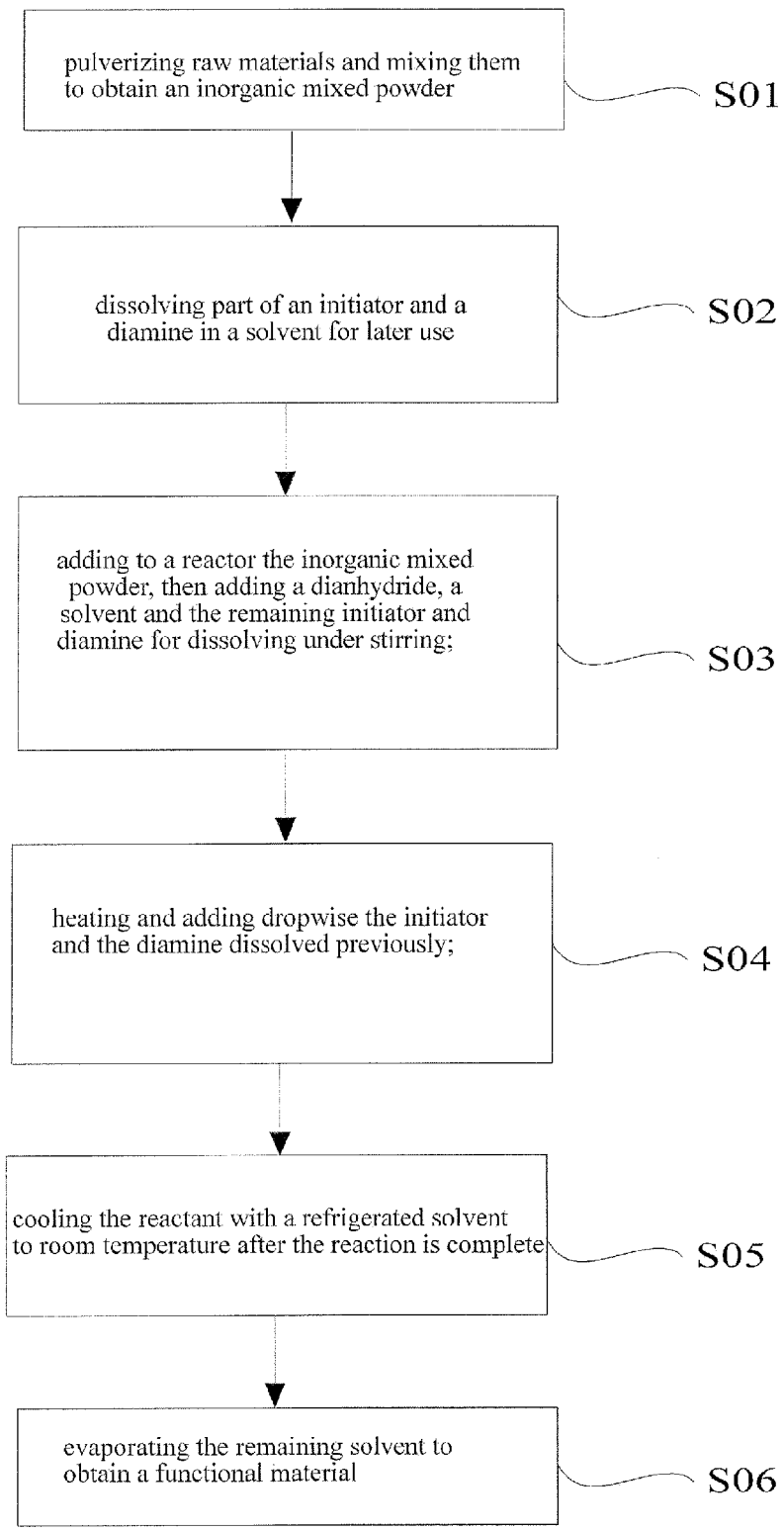
FIG. 1 is a flow chart of a method for preparing a functional material according to an example of the present invention.

1. a display panel; 2. a touch structure; 21. a touchpad; 22. a surface film layer; 23. a cover plate; and 3. a functional material.

DETAILED DESCRIPTION

To enable those skilled in the art to better understand the technical solution of the present invention, further detailed descriptions are made for the present invention with reference to the drawings and embodiments.

The present embodiment provides a functional material and a method for preparing the same.

The functional material comprises an inorganic mixed powder having a modified layer on its surface, the inorganic mixed powder comprising a primary ingredient and a secondary ingredient;

the primary ingredient consisting of boron oxide, sodium oxide, lithium oxide, and zirconium oxide;

the secondary ingredient including any one or more of aluminum oxide, zinc oxide, titanium oxide, silicon dioxide, calcium oxide, silver complexes, silver phosphate, silver nitrate, tourmaline, silver thiosulfate, carbon nanotubes, aluminum sulfate, manganese, manganese oxide, iron, iron oxide, cobalt, cobalt oxide, nickel, nickel oxide, chromium, chromium oxide, copper, copper oxide, magnesium oxide, boron carbide, silicon carbide, titanium carbide, zirconium carbide, tantalum carbide, molybdenum carbide, boron nitride, chromium nitride, titanium nitride, zirconium nitride, aluminum nitride, chromium boride, $Cr_3B_4$, titanium boride, zirconium boride, tungsten disilicide, and titanium disilicide;

the modified layer being generated by reaction of a dianhydride and a diamine.

The particle diameter of the inorganic mixed powder is from nanometers to micrometers, specifically, for example, from 1 to 5000 nm, preferably from 10 to 500 nm. The particle diameter can be measured, for example, by a Malvern laser particle size analyzer.

Dianhydride refers to a substance containing at least two anhydride groups in the molecular structure; while diamine refers to a substance containing at least two amine groups (or amino groups) in the molecular structure.

The dianhydride, for example, contains at least one phenyl group, and is preferably any one of pyromellitic dianhydride, trimellitic anhydride, benzophenone dianhydride, biphenyl dianhydride, diphenyl ether dianhydride, and 4,4'-(Hexafluorosopropylidene)diphthalic anhydride.

The diamine, for example, contains at least one phenyl ring or at least one non-phenyl six-membered carbocyclic ring (e.g. cyclohexane), preferably any one of 3-aminobenzylamine, 2,2'-difluoro-4,4'-(9-fluorenylidene)diphenylamine, 2,2-bis(3-amino-4-hydroxyphenyl)hexafluoropropane, hexahydro-m-xylylene diamine, 1,4-bis(aminomethyl)cyclohexane, 2,2-bis[4-(4-aminophenoxy)phenyl]hexafluoropropane, 2,2-bis(3-amino-4-methylphenyl)hexafluoropropane, 2,2-bis(3-aminophenyl)hexafluoropropane, 2,2-bis(4-aminophenyl)hexafluoropropane, 2,7-diamino-fluorene, m-xylylenediamine, and 4,4'-methylene bis(2-ethyl-6-methylaniline).

The molar ratio of the dianhydride to the diamine is from 0.85:1 to 1.05:1, preferably from 0.92:1 to 1.05:1.

Our studies have revealed that the modified layer generated by reaction of the above dianhydride and diamine can desirably improve the properties of the inorganic mixed powder.

Functional materials of the present embodiment can emit far-infrared light and negative ions. Far-infrared light, after being absorbed by a human body, can allow water molecules in the body to resonate and be activated, which enhances the intermolecular bonding force, thereby activating proteins and other biological macromolecules and bringing the organism cells to the highest vibration level. Furthermore, far-infrared heat can be transferred to a subcutaneous deeper part, thus increasing the temperature of the subcutaneous deeper part, expanding the capillaries, promoting the blood circulation, strengthening the metabolism among tissues, promoting a tissue regeneration capacity, enhancing the organism immunity, and bringing the vivacity. On the other hand, negative ions can decompose and oxidize bacteria and organic substances, and may serve the function of disinfection and sterilization and produce the effect of improving air quality. Therefore, the functional material may play a role in health care and is environmentally friendly.

The method for preparing the above functional material comprises: mixing the inorganic mixed powder, the dianhydride, and the diamine with an initiator and a solvent uniformly; and heating to react the dianhydride with the diamine, to form the modified layer on the surface of the inorganic mixed powder.

To be specific, as shown in FIG. 1, the above preparation method may comprise:

S01, in the case of using a dispersant, pulverizing the raw materials respectively into powder and mixing the same uniformly in proportion, or mixing the raw materials in proportion uniformly and then pulverizing the same, to yield an inorganic mixed powder;

wherein the dispersant may be chosen from conventional dispersants such as BYK 161 manufactured by BYK Additives & Instruments and Solsperse 32500 and Solsperse 22000 manufactured by The Lubrizol Corporation; pulverization may be carried out using conventional methods such as ball milling, grinding, and the like; as the inorganic mixed powder may be prepared by existing methods, no further details will be provided herein.

S02, dissolving from a fourth to a third of an initiator and from a fourth to a third of a diamine in a solvent for later use.

The mass ratio of the inorganic mixed powder to the substance generated by the reaction of the dianhydride and the diamine is from 20:1 to 1:1.

That is to say, the amounts of the dianhydride and the diamine are determined as follows: assuming a complete reaction between the dianhydride and the diamine to yield a resultant (which is actually a modified layer), if the mass of the resultant is 1, then the mass of the inorganic mixed powder is between 1 and 20; such an amount can ensure that a modifier layer with a suitable thickness can be obtained on the inorganic mixed powder.

An initiator is used to initiate the reaction, which, for example, is a nitrogen-based initiator, preferably any one of azobisisobutyronitrile, 2,2'-azobis(2,4-dimethylvaleronitrile), dimethyl azobisisobutyrate, and azobis isovaleronitrile.

The solvent can be selected from fatty alcohols, glycol ethers, ethyl acetate, methyl ethyl ketone, methyl isobutyl ketone, ethylene glycol monomethyl ether, γ-butyrolactone, ethyl 3-ethoxypropionate, butyl carbitol, butyl carbitol acetate, propylene glycol monomethyl ether, propylene glycol monomethyl ether acetate, cyclohexane, xylene, isopropanol, and other conventional organic solvents. Since the choice of the solvent has no significant effect on the performance of the final product, propylene glycol monomethyl ether acetate is used in all the Examples as a solvent.

S03, adding the inorganic mixed powder to a reaction vessel (e.g., a four-neck flask) which is then subjected to stirring, shocking, shaking and the like; afterwards, adding the dianhydride and the solvent as well as the remaining initiator and diamine and allowing them to be dissolved uniformly.

S04, heating to carry out the reaction for example in two steps, specifically comprising: heating at a temperature of 35 to 70° C. for 20 to 40 min; and then continuing heating at a temperature of 70 to 100° C. for 20 to 40 min.

During the above heating process, the dianhydride and the diamine are allowed to react, thereby generating a modified layer on the surface of the inorganic mixed powder; wherein heating is carried out in two steps so as to prevent the reaction from being too severe.

During the reaction process, the above solution prepared by dissolving an initiator and a diamine is gradually added dropwise to a four-neck flask so as to prevent the reaction from being too severe.

The reaction in this step may be carried out, for example, under the protection of nitrogen, and for example under constant stirring.

The solvent in each step is in an amount sufficient to disperse and dissolve the substances therein uniformly, while the initiator is in an amount sufficient to initiate the reaction, which can be adjusted by those skilled in the art based on the actual conditions, and thus no further detail is given herein. However, the mass ratio (all referring to the total amount) of the inorganic mixed powder, the initiator and the solvent is generally 1:(from 0.25 to 0.4):(from 1 to 1.5). To achieve consistency in the process of preparing the functional material in the various Examples, the mass ratio of the inorganic powder, the initiator and the solvent is 1:0.3:1.4.

S05, cooling the reactant with a refrigerated solvent to room temperature (at about 10 to 30° C.) after the reaction is complete.

S06, evaporating the remaining solvent or separating the powder therefrom, to yield an inorganic mixed powder with a modified layer, i.e., a functional material.

Of course, it should be appreciated that the preparation method described above may undergo a number of variations, e.g., the dianhydride, the diamine, and the initiator can be dissolved once in the solvent; for another example, heating can be carried out in one step. After all, any variation is allowed as long as the dianhydride and the diamine can react to form a modified layer on the surface of the inorganic mixed powder.

The infrared emissivity of the functional material is measured according to the GB/T 7287-2008 standard test, and the amount of anions generated by the functional material is measured using an air anion analyzer (for example, Japan KEC Corporation's KEC-900 type).

Various functional materials were prepared according to the method described above, where the materials, amounts, parameters and product properties are shown in the following tables.

TABLE 1

Information about the primary ingredient in the inorganic mixed powder of the functional materials in Examples (content unit: by mass parts)

| Example # | Content of Boron Oxide | Content of Sodium Oxide | Content of Lithium Oxide | Content of Zirconium Oxide |
|---|---|---|---|---|
| 1 | 3.83 | 1.83 | 6.73 | 20 |
| 2 | 5.18 | 2.27 | 8.16 | 25 |
| 3 | 6.5 | 3.6 | 10.5 | 30 |
| 4 | 7.17 | 3.6 | 10.5 | 30 |

TABLE 2

Information about the secondary ingredient in the inorganic mixed powder of the functional materials in Examples (content unit: by mass parts)

| Example # | Secondary Ingredient 1 Type | Secondary Ingredient 1 Content | Secondary Ingredient 2 Type | Secondary Ingredient 2 Content | Secondary Ingredient 3 Type | Secondary Ingredient 3 Content |
|---|---|---|---|---|---|---|
| 1 | Silicon Dioxide | 40 | Manganese Oxide | 1.2 | Calcium Oxide | 0.98 |

TABLE 2-continued

Information about the secondary ingredient in the inorganic mixed powder
of the functional materials in Examples (content unit: by mass parts)

| Example # | Secondary Ingredient 1 Type | Secondary Ingredient 1 Content | Secondary Ingredient 2 Type | Secondary Ingredient 2 Content | Secondary Ingredient 3 Type | Secondary Ingredient 3 Content |
|---|---|---|---|---|---|---|
| 2 | Silicon Dioxide | 40 | Aluminum Nitride | 15 | Silver Phosphate | 3 |
| 3 | Silicon Dioxide | 40 | Nickel Oxide | 1.4 | Chromic Oxide | 1.4 |
| 4 | Alumina | 10 | Magnesium Oxide | 10 | None | None |

TABLE 3

Information about raw materials for preparing a modified layer in the functional materials of Examples

| Example # | Dianhydride Type | Diamine Type | Mass Ratio of Dianhydride to Diamine | Mass Ratio of Inorganic Mixed Powder to Resultant | Initiator Type |
|---|---|---|---|---|---|
| 1 | Benzophenone Dianhydride | 1,4-bis(aminomethyl)cyclohexane | 0.85:1 | 20:1 | Azobisisovaleronitrile |
| 2 | Biphenyl Dianhydride | 3-amino-benzylamine | 0.92:1 | 1:1 | Azobisisovaleronitrile |
| 3 | 4,4'-(Hexafluoroisopropylidene)diphthalic anhydride | Hexahydro-m-xylylene diamine | 1:1 | 12:1 | Azobisisobutyronitrile |
| 4 | Pyromellitic Dianhydride | 2,7-diamino-fluorene | 1.05:1 | 15:1 | 2,2'-azobis(2,4-dimethylvaleronitrile) |

TABLE 3

Preparation parameters and performance testing results of the functional materials in Examples

| Example # | Heating temperature at the first stage (° C.) | Heating duration at the first stage (min) | Heating temperature at the second stage (° C.) | Heating duration at the second stage (min) | Infrared emissivity (%) | Anion concentration (per cubic centimeter) |
|---|---|---|---|---|---|---|
| 1 | 35 | 40 | 70 | 40 | 85 | 2572 |
| 2 | 70 | 20 | 100 | 20 | 88 | 2466 |
| 3 | 45 | 35 | 80 | 35 | 92 | 2785 |
| 4 | 55 | 25 | 90 | 25 | 94 | 2810 |

As can be seen from the above, all the functional materials of the Examples have a high infrared emissivity and a high anion concentration, which indicates that they actually can produce far-infrared light and anions, thereby improving the environment.

Figure 2:
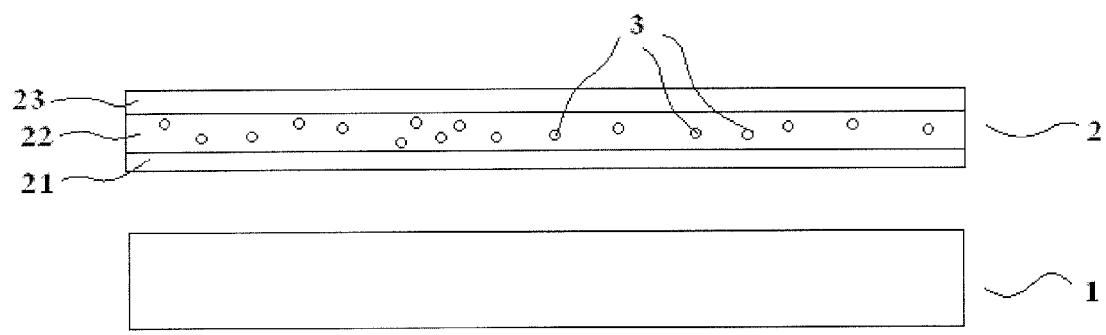
FIG. 2 is a schematic cross-sectional diagram of a touch display device according to an example of the present invention; wherein the reference signs are.

As shown in FIG. 2, the present embodiment also provides a touch structure 2 and a touch display device.

The touch structure 2 comprises a touchpad 21 for touching and a surface film layer 22 provided outside the touchpad, the surface film layer 22 comprising the above functional material 3. For example, the thickness of the surface film layer 22 is from 50 to 1000 nm, wherein the mass percentage of the functional material 3 in the surface film layer 22 is, for example, from 0.1 to 10%, preferably from 0.5 to 5%.

In another word, a surface film layer 22 is further provided outside the touchpad 21 (i.e. the side far away from the display panel) for realizing touching function. The surface film layer 22 has a thickness from 50 to 1000 nm, and comprises the functional material 3 with a mass percentage (based on the total mass 100% of the surface film layer 22 and the functional material 3) from 0.1% to 10%.

Specifically, the surface film layer 22 can be formed from known materials such as photo-curable resins, thermosetting resins or the like, wherein the functional material 3 can be incorporated in several different ways:

for example, the functional material 3 can be doped directly into the materials used to form the surface film layer 22, so that the surface film layer 22 will comprise the functional material 3 upon being formed;

alternatively, the surface film layer 22 can be formed and pre-cured, and then the functional material 3 is allowed to enter it by means such as sputtering followed by finally curing the surface film layer 22.

For another example, a substrate (such as a touch panel 21) can be first coated with the functional material 3, followed by forming a surface film layer 22 thereon, which also allows the functional material 3 to enter the surface film layer 22.

For example, the above touch structure 2 further comprises a cover plate 23 disposed outside the touchpad 21, wherein the surface film layer 22 is disposed outside the cover plate 23 or between the touchpad 21 and the cover plate 23.

In other words, a cover plate 23 for protecting the touchpad 21 can further be provided outside the touchpad 21. While there is a cover plate 23, the surface film layer 22 may be disposed outside the cover plate 23 (can be directly provided on the cover plate 23), or disposed between the touchpad 21 and the cover plate 23 (can be provided either on the cover plate 23 or on the touchpad 21).

Of course, there may be no cover plate 23 outside the touchpad 21, i.e. the touchpad 21 can also serve the function of the cover plate 23 (OGS way).

As the touch structure 2 of the present embodiment is observed, it is found that the functional material 3 therein does not agglomerate or shed, suggesting that the functional material 3 can bond well with the touch structure 2.

The inorganic mixed powder in the function material 3 of the present embodiment has on its surface a modified layer which can allow the inorganic mixed powder to bond well with the surface film layer 22, and can improve the inorganic mixed powder's capacity to emit far-infrared light and anions, thereby allowing the functional material 3 to be well incorporated into the touch structure 2 and increasing its environmental friendliness without affecting the performance of the touch structure 2 itself.

The touch display device of the present embodiment comprises the touch structure 2 described above.

Specifically, the touch display device may comprise a display panel 1, and the above touch structure 2 is provided outside the light-exiting surface of the display panel 1.

It shall be understood that although FIG. 2 is illustrated using the touchpad 21 and the display panel 1 being two separate parts, it is also plausible that the touchpad 21 and the display panel 1 are integral, in other words, the touchpad 21 is also a certain basal plate of the display panel 1 (i.e. ICT way).

The touch display device of the present embodiment is particularly suitable for mobile phones.

It may be appreciated that the above embodiments are merely exemplary embodiments to illustrate the principles of the present invention, but the present invention is not limited thereto. Those of ordinary skill in the art, without departing from the spirit and essence of the present invention, may make various changes and improvements. Such changes and improvements are deemed within the scope of the invention.

The present application claims priority to the Chinese patent application No. 201410366545.4 filed on Jul. 29, 2014, which is incorporated by reference herein as part of this application.

What is claimed is:

1. A touch structure comprising a touchpad for touching, wherein a surface film layer containing a functional material is provided outside the touchpad,
the functional material comprises an inorganic mixed powder having a modified layer on its surface, wherein the inorganic mixed powder comprises
boron oxide, sodium oxide, lithium oxide, zirconium oxide, and
any one or more of aluminum oxide, zinc oxide, titanium oxide, silicon dioxide, calcium oxide, silver complexes, silver phosphate, silver nitrate, tourmaline, silver thiosulfate, carbon nanotubes, aluminum sulfate, manganese, manganese oxide, iron, iron oxide, cobalt, cobalt oxide, nickel, nickel oxide, chromium, chromium oxide, copper, copper oxide, magnesium oxide, boron carbide, silicon carbide, titanium carbide, zirconium carbide, tantalum carbide, molybdenum carbide, boron nitride, chromium nitride, titanium nitride, zirconium nitride, aluminum nitride, chromium boride, Cr3B4, titanium boride, zirconium boride, tungsten disilicide, and titanium disilicide; and
the modified layer is generated by reaction of a dianhydride and a diamine,
wherein the thickness of the surface film layer is from 50 to 1000 nm, wherein the mass percentage of the functional material in the surface film layer is from 0.1% to 10%.

2. The touch structure according to claim 1, wherein, the mass percentage of the functional material hi the surface film layer is from 0.5% to 5%.

3. The touch structure according to claim 1, further comprising:
a cover plate provided outside the touchpad, wherein the surface film layer is disposed outside the cover plate or between the touchpad and the cover plate.

4. The touch structure according to claim 1, wherein the touch structure is used in a touch display.

5. The touch structure according to claim 1, wherein the molar ratio of the dianhydride to the diamine for generating the modified layer in the functional material is from 0.85:1 to 1.05:1.

6. The touch structure according to claim 5, wherein the molar ratio of the dianhydride to the diamine for generating the modified layer in the functional material is from 0.92:1 to 1.05:1.

7. The touch structure according to claim 1, wherein the dianhydride for generating the modified layer in the functional material contains at least one phenyl group, and
the diamine for generating the modified layer in the functional material contains at least one phenyl ring or at least one non-phenyl six-membered carbocyclic ring.

8. The touch structure according to claim 7, wherein
the dianhydride for generating the modified layer in the functional material is selected from any one of pyromellitic dianhydride, benzophenone dianhydride, biphenyl dianhydride, diphenyl ether dianhydride, and 4,4'-(Hexafluoroisopropylidene)diphthalic anhydride;
the diamine for generating the modified layer in the functional material is selected from any one of 3-amino-benzylamine, 2,2'-difluoro-4,4'-(9-fluorenylideneidene)diphenylamine, 2,2-bis(3-amino-4-hydroxyphenyl)hexafluoropropane, hexahydro-m-xylylene diamine, bis(aminomethyl)cyclohexane, 2,2-bis[4-(4-amino-phenoxy)phenyl]hexafluoropropane, 2,2-bis(3-amino-4-methylphenyl)hexafluoropropane, 2,2-bis(3-aminophenyl)hexafluoropropane, 2,2-bis(4-aminophenyl)hexafluoropropane, 2,7-diaminofluorene, m-xylylenediamine, and 4,4'-methylene bis (2-ethyl-6-methylaniline).

* * * * *